United States Patent [19]

Dorf et al.

[11] Patent Number: 4,906,712

[45] Date of Patent: Mar. 6, 1990

[54] PROCESS FOR THE PREPARATION OF POLYARYLENE SULPHIDES

[75] Inventors: Ernst-Ulrich Dorf; Hans-Rudolph Dicke; Wolfgang Rüsseler; Volker Eckhardt; Joachim Genz, all of Krefeld, Fed. Rep. of Germany

[73] Assignee: Bayer Aktiengesellschaft, Leverkusen, Fed. Rep. of Germany

[21] Appl. No.: 268,571

[22] Filed: Nov. 8, 1988

[30] Foreign Application Priority Data

Nov. 11, 1987 [DE] Fed. Rep. of Germany ....... 3738277

[51] Int. Cl.$^4$ ............................................ C08G 75/14
[52] U.S. Cl. ......................................... 526/62; 528/14; 528/20; 528/21; 528/25; 528/27; 528/28; 528/30; 528/388
[58] Field of Search ....................... 528/14, 20, 21, 30, 528/27, 25, 28, 388; 526/62

[56] References Cited

U.S. PATENT DOCUMENTS

| | | | |
|---|---|---|---|
| 3,354,129 | 11/1967 | Edmonds et al. | 528/388 |
| 3,706,702 | 12/1972 | Studinka et al. | 528/86 |
| 4,496,720 | 1/1985 | Bruynes et al. | 548/110 |

FOREIGN PATENT DOCUMENTS 0088831 9/1983 European Pat. Off. .
2009323 2/1970 Fed. Rep. of Germany .

OTHER PUBLICATIONS

Chemical Abstracts 98:79580g (1981).
Chemical Abstracts, 98:107389 J (1983).

*Primary Examiner*—John C. Bleutge
*Assistant Examiner*—David W. Woodward
*Attorney, Agent, or Firm*—Connolly and Hutz

[57] ABSTRACT

This invention relates to a process for the preparation of polyarylene sulphides by melt condensation, in which the sulphide bridges of the polymer are formed by the splitting off of a compound which is volatile under the reaction conditions.

12 Claims, No Drawings

PROCESS FOR THE PREPARATION OF POLYARYLENE SULPHIDES

This invention relates to a process for the preparation of polyarylene sulphides by melt condensation, in which the sulphide bridges of the polymer are formed by the splitting off of a compound which is volatile under the reaction conditions.

Polyarylene sulphides (PAS) and processes for their preparation are already known (from halogenated thiophenolates: e.g. US-PS 32 74 165, J. Polymer Sci. 58 (1962) 351-367; from sodium sulphide and dihalogenated aromatic compounds: US-PS 33 54 129).

These processes have the disadvantage that they require the use of solvents. This is not only expensive but requires the use of expensive apparatus, recovery cycles for recovering the solvent, elaborate procedures for working up the sodium chloride formed as by-product and a completely separate process step for granulating the product.

The process according to the present invention avoids these disadvantages since bis(silyl)thioethers and dihalogenated aromatic compounds can be condensed without the use of solvents. Another advantage is that condensation carried out under the reaction conditions gives rise to the splitting off of volatile products which can escape from the reaction vessel. The PAS is obtained very pure in a molten form.

The process according to this invention is characterised in that mixtures of bis-(silyl)thioethers corresponding to formulae I and/or II and dihalogenated aromatic compounds of formula III $$R_3Si—S—SiR_3 \qquad (I)$$

$$R_3Si—S—Ar—S—SiR_3 \qquad (II)$$

$$Hal—Ar—Hal \qquad (III)$$

wherein

Hal stands for a halogen such as F or cl,

Ar stands for mononuclear or condensed $C_6$-$C_{24}$ aromatic groups with two bonds or heterocyclic groups with up to 3 heterto atoms such as N, O or S or two single-bonded aromatic or heterocyclic units which may be linked by a single bond and/or by way of two-bonded $C_6$-$C_{24}$ aromatic or heterocyclic groups and/or by way of one or more units selected from O, $NR^1$, $CR^1_2$, S, S(O), S(O)$_2$, C(O), C(O)-O, C-(O)-$NR^1$ and [C(O)-]$_2$N ($R^1$ = $C_1$-$C_4$-alkyl, $C_5$-$C_{10}$-cycloalkyl, $C_6$-$C_{24}$-aryl or $C_7$-$C_{30}$-aralkyl or alkaryl), the individual aromatic rings optionally carrying 1 to 4 substituents $R_2$ selected from the groups mentioned under $R_1$ and/or $OR^1$, $NR^1$, $CR^1_3$, $SR^1$, S(O)—$R^1$, S(O)$_2$—$R^1$, C(O-)—$R^1$, C(O)—O—$R^1$ and C(O)—$NR^1_2$, and stands for $C_1$-$C_4$-alkyl or $C_5$-$C_{20}$-cycloalkyl containing the components of the mixture in proportions of (I and/or II):III of from 0.9:1 to 1.1:1 are reacted optionally in the presence of from 0.01 to 1.% by weight (based on the quantity of the starting materials of formulae I and/or II and III) of at least one alkali metal and/or alkaline earth metal or ammonium halide as catalyst and optionally in the presence of from 0.01 to 1% by weight (based on the quantity of the starting materials corresponding to formula I and/or II and III) of a cocatalyst selected from conventional phase transfer catalysts at temperatures from 150 to 400° C. with elimination of halogenated trialkylsilane or halogenated (tris)cycloalkylsilane.

Fluorides of the alkali metals (e.g. Na, K, Cs) and of alkaline earth metals (e.g. Mg, Ca) and ammonium fluoride are preferred catalysts.

The process according to the invention can be performed e.g. in an apparatus in which all parts which come into contact with the (hot) reaction mixture (walls, stirring equipment etc.), are made out of materials or are coated with materials which do not release heavy metal ions. Preferred materials are glass, titanium zirconium etc. If those materials are used, no catalyst or co-catalyst must be present in the reaction mixture.

In case the inventive process is carried out in an apparatus made for example from stainless steel, the presence of catalysts and co-catalysts can be advantageous.

The reaction vessel can also be made out of different materials e.g. out of glass and titanium etc. the apparatus can be made e.g. partially out of titanium and partially out of glass.

The pressure may be from 0.3 to about 4 bar. The reaction may be carried out continuously or intermittently (batchwise process). The reaction time can vary within a wide range. The reaction vessel is advantageously equipped with an apparatus for the condensation of the halogenated trialkylsilane or halogenated (tris)cycloalkylsilane which may be used again for the synthesis of fresh starting material. Apparatus for processing the polymer, such as extruders, kneaders, etc., may be directly attached to the reaction vessel or integrated with the reaction vessel.

(Halogenarylthio)-silanes corresponding to formula (IV)

$$Hal—Ar—S—SiR_3 \qquad (IV),$$

wherein Ar, R and Hal have the meanings indicated in formulae (I) (II) and (III) may be added to the reaction mixture.

The degree of condensation may be influenced by varying the starting materials.

For example, the polymerisation reaction may be controlled by the addition of certain quantities of monofunctional compounds of formula (V) and/or formula (VI)

$$R^3—Ar—S—SiR_3 \qquad (V)$$

$$Hal—Ar—R^3 \qquad (VI)$$

in which $R^3$ stands for $R^2$ or H and

R, $R^2$, Hal and Ar have the meanings given for formulae (I), (II) and (III).

The use of trifunctional starting materials enables the molecular weight to be further increased until crosslinking takes place.

The process is also suitable for the synthesis of block copolymers in which the individual blocks are formed by the homopolymerisation of various starting materials of different structures before the blocks are joined together.

The process according to the invention may be carried out in the presence of additives and diluents which remain inert under the reaction conditions, for example, aprotic organic solvents (e.g. N-alkyllactams, N,N'-dialkyl-N,N'-alkyleneureas, diphenylethers, biphenyl, etc.), polymers or inorganic inert substances.

The following are examples of bis(silyl)thioethers of formula (I) or (II) suitable for the process according to the invention: Bis-(trimethylsilyl)sulphide, 1,4-bis(-trimethylsilylthio)benzene, 1,3-bis(trimethylsilylthio)-benzene, 4,4′-bis(trimethylsilylthio)diphenylsulphide, 4,4′-bis(trimethylsilylthio)diphenylether, 4,4′-bis(trimethylsilylthio)-biphenyl, 4,4′-bis(trimethylsilylthio)-diphenylsulphone, 4,4′-bis(trimethylsilylthio)benzophenone, etc. The following are preferred: 1,4-Bis(trimethylsilylthio)benzene, 1,3-bis(trimethylsilylthio)benzene, 4,4′-bis(trimethylsilylthio)-diphenylsulphide, 4,4′-bis(trimethylsilylthio)diphenylether and 4,4′-bis(trimethylsilylthio)biphenyl.

The following are examples of dihalogenated aromatic compounds corresponding to formula (III) suitable for the process according to the invention: 1,4′Dichlorobenzene, 1,3-dichlorobenzene, 4,4′-dichlorodiphenylsulphide, 4,4′-dichlorodiphenylether, 4,4′-dichlorobiphenyl, 4,4′-dichlorobenzophenone, 4,4′-dichlorodiphenylsulphone, 1,4-difluorobenzene, 1,3-difluorobenzene, 4,4′-difluorodiphenylsulphide, 4,4′-difluorodiphenylether, 4,4′-difluorobiphenyl, 4,4′-difluorobenzophenone, 4,4′-difluorodiphenylsulphone, etc.

The following are preferred: 4,4′-Dichlorodiphenylsulphide, 4,4′-dichlorodiphenylether, 4,4′-dichlorobenzophenone, 4,4′-dichlorodiphenylsulphone and 4,4′-dichlorobiphenyl.

The following are examples of halogenated arylthiosilanes of formula (IV) suitable for the process according to the invention: 4-Chlorophenyl-trimethylsilylthioether, 3-chlorophenyl-trimethylsilylthioether, 4-fluorophenyl-trimethylsilylthioether, 3-fluorophenyl-trimethylsilylthioether, 4-chloro-4′-(trimethylsilylthio)-diphenyl, 4-fluoro-4′-(trimethylsilylthio)biphenyl, 4-chloro-4′-(trimethylsilylthio)-benzophenone, 4-fluoro-4′-(trimethylsilylthio)benzophenone, etc.

The following are preferred: 4-Chlorophenyl-trimethylsilylthioether, 3-chlorophenyl-trimethylsilylthioether and 4-chloro-4′-(trimethylsilylthio)biphenyl.

Examples of monofunctional compounds of formula (V) suitable for the process according to the invention are (phenylthio)trimethylsilane, 4-(trimethylsilylthio)-diphenylsulphide, etc.

The following are examples of monofunctional compounds of formula (VI) suitable for the process according to the invention: 4-Chlorodiphenyl, 1-chloronaphthalene, 2-chloronaphthalene, 4-chlorodiphenylsulphide, 4-chloro-diphenylether, 4-fluorodiphenyl, 1-fluoronaphthalene, 2-fluoronaphthalene, 4-fluorodiphenylsulphide, 4-fluorodiphenylether, etc.

4-Chlorodiphenyl, 4-chlorodiphenylsulphide and 4-chlorodiphenylether are preferred.

The following are examples of catalysts suitable for the process of the invention: Ammonium chloride, ammonium fluoride, lithium chloride, lithium fluoride, sodium chloride, sodium fluoride, potassium chloride, potassium fluoride, rubidium chloride, rubidium fluoride, caesium chloride, caesium fluoride, calcium chloride, calcium fluoride, etc.

Potassium fluoride, caesium chloride and caesium fluoride are preferred.

18-Crown-6 and dibenzo-18-crown-6, etc. are examples of phase transfer catalysts suitable for use as cocatalysts according to the invention.

The melt flow of polyarylenesulphides is generally determined according to ASTM 1238-70 at 316° C., using a 5 kg weight, and expressed in terms of g/10 min.

If the melt flow values are high, this measurement may cause difficulties due to the high outflow rate of the polymer melt.

The melt viscosity $\eta_m$ of the polymer melt (in Pa.s) was therefore determined at 306° C. in dependence upon the shear stress (in Pa), using an Instron Rotation viscosimeter.

This enables the melt viscosity to be determined over a very wide range of from $10^{-1}$ to $10^7$ Pa.s. In the Instrom Rheometer, the polymer is melted between a fixed plate and a rotatable cone and the torque of the cone is determined. The melt viscosity in dependence upon the shear stress can be calculated from the torque, the angular velocity and the data of the apparatus. Rheometer Model 3250 of Instron was used.

The melt viscosity is expressed in terms of the value obtained at a shear stress of $\tau = 10^2$ Pa.

When the polyarylene sulphides according to the invention are freshly prepared, they generally have a melt viscosity of from $0.1 \cdot 10^1$ to $5 \cdot 10^4$ Pa.s, preferably from $0.1 \cdot 10^1$ to $1.5 \cdot 10^3$ Pa.s.

Immediately after their preparation, the polyarylene sulphides prepared according to the invention may be mixed with other polymers, pigments and fillers, for example with graphite, metal powder, glass powder, quartz powder, fused silica, glass fibres or carbon fibres and the usual stabilizers and mould release agents for polyarylene sulphides may be added. The polyarylene sulphides produced according to the invention may be directly worked up into films, fibres or moulded products by extrusion, extrusion blowing, injection moulding or other conventional processing techniques.

They may be used for the usual purposes, e.g. as parts of motor vehicles, mountings and fittings, electrical parts such as switches, electronic panels, electronic parts, chemically resistant and weather resistant parts and apparatus such as pump housings and pump impellers, dishes for etching baths, sealing rings, parts of office machinery and telecommunication equipment, household appliances, etc.

EXAMPLE 1

5 g of 4,4′-Bis-(trimethylsilylthio)-diphenylether and 3.4 g of 4,4′-dichlorodiphenylsulphide are introduced into a stirrer apparatus at 165° C. together with 100 mg of caesium fluorde and heated stepwise. After a steady rise in temperature at 340° C. over 14 hours, during which a readily volatile condensate evaporates, the reaction mixture is left to cool. The presence of trimethylchlorosilane can be demonstrated in the condensate. The cake of molten substance is broken down, taken up with isopropanol and washed. After drying in a vacuum, 3.9 g (=71%) of a grey powder having a melt viscosity of 5 Pa.s and a melting point of 271° C. are obtained as residue.

EXAMPLE 2

5 g of 4,4′-bis-(trimethylsilylthio)-diphenylether, 3.4 g of 4,4′-dichlorodiphenyl sulphide and 3 g (4-chlorophenylthio)-trimethylsilane are introduced into a stirrer apparatus at 165° C. together with 100 mg of caesium fluoride and heated stepwise. The reaction mixture begins to boil at a temperature of 270° C. After a steady rise of temperature to 340° C. over a period of 14 hours, during which a readily volatile condensate evaporates off and reflux gradually ceases, the reaction mixture is left to cool. The presence of trimethylchlorosilane can be demonstrated in the condensate. The cake of molten substance is broken down, taken up with isopropanol and washed. 4.8 g (=69%) of a grey powder having a melt viscosity of 7 Pa.s and a melting point of 258° C. are obtained after drying in a vacuum.

EXAMPLE 3

5 g 4,4'-bis-(trimethylsilylthio)-diphenylether and 3.4 g 4,4'-dichlorodiphenylsulfide are introduced in a glass apparatus with titanium stirrer at 165° C. and heated up stepwise. After 30 h continuously heating up to 340° C., whereby a readily volatile condensate evaporates off, the reaction mixture is left to cool. In the condensate trimethylchlorosilane can be found. The cake of molten substance is broken down and taken up with isopropanol and washed. 4.1 g (=75%) of a grey powder having a melt viscosity of 14 Pa.s and a melting poit of 217° C. are obtained after drying in a vacuum.

We claim:

1. Process for the preparation of polyarylene sulphides which comprises reacting a mixture of bis(silyl) thioethers corresponding to formulae (I) or (II), or both (I) and (II) and dihalogenated aromatic compounds corresponding to formula (III)

$$R_3Si-S-SiR_3 \quad (I)$$

$$R_3Si-S-Ar-S-SiR_3 \quad (II)$$

$$Hal-Ar-Hal \quad (III)$$

in which

Hal stand for halogen,

Ar stands for divalent mononuclear or polynuclear $C_6-C_{24}$-aromatic groups or heterocyclic groups containing up to 3 hetero atoms or divalent aromatic or heterocyclic units linked by a single bond or by divalent $C_6-C_{24}$-aromatic or heterocyclic groups or by one or more units selected from O, $NR^1$, $CR^1_2$, S, S(O), S(O)$_2$, C(O), C(O)-O C-(O)-$NR^1$ or 9((O)-)$_2$N- wherein $R^1$ is $C_1-C_4$-alkyl, $C_5-C_{10}$-cycloalkyl, $C_6-C_{24}$-aryl or $C_7-C_{30}$-aralkyl or $C_7-C_{30}$ alkaryl, the individual aromatic rings being unsubstituted or substituted by 1 to 4 substituents $R^2$ selected from the groups defined for $R^1$ or $OR^1$, $NR^1$, $CR^1_3$, $SR^1$, $S(O)-R^1$, $S(O)_2-R^1$, $C(O)-R^1$, $C(O)-O-R^1$ or $C(O)-NR^1_2$, and stands for $C_1-C_4$-alkyl or $C_5-C_{20}$-cycloalkyl, said mixture containing the components (I and II):III in proportions of from 0.9:1 to 1.1:1, at temperatures from 150 to 400° C. with splitting off halogenated trialkylsilane or halogenated (tris)-cycloalkylsilane so as to form said polyarylene sulfides.

2. A process according to claim 1, wherein said mixture is reacted in the presence of from 0.01 to 1% by weight (based on the quantity of the starting materials of formulae I or II, or both, and III) of at least one alkali metal or alkaline earth metal halide, or both, or at least one ammonium halide as catalyst.

3. Process according to claim 2, characterised in that the catalyst is an alkali metal, alkaline earth metal or ammonium fluoride.

4. Process according to claim 2 characterised in that the catalyst used is cesium fluoride.

5. Process according to claim 6, characterised in that the catalyst used in cesium chloride.

6. A process according to claim 2, wherein said mixture is reacted in the presence of from 0.01 to 1% by weight of a cocatalyst selected from conventional phase transfer catalysts at temperatures from 150 to 400° C. with splitting off of halogenated trialkylsilane or halogenated (tris)-cycloalkylsilane.

7. Process according to claim 2, characterised in that potassium fluoride is used as catalyst and the crown ether, 18-crown-6, is used as cocatalyst.

8. Process according to claim 1, characterised in that a (halogenarylthio)silane corresponding to the general formula (IV)

$$Hal-Ar-S-SiR_3 \quad (IV),$$

wherein

Hal, Ar and R have the meanings indicated in claim 1, is used in addition to the mixture of bis(silyl)-thioethers of general formulae (I) and (II) and the dihalogenated aromatic compounds of the general formula (III).

9. Process according to claim 8, characterised in that (4-chlorophenylthio)trimethylsilane is used as the (halogenated arylthio)silane of formula (IV).

10. Process according to claim 1, characterised in that the apparatus in which all parts which come into contact with the (hot) reaction mixture are made out of materials or are coated with materials which do not release heavy metal ions.

11. Process according to claim 10, characterised in that no catalyst or co-catalyst is used.

12. Process according to claim 10, characterised in that the reaction apparatus is made out of titanium, glass or both.

* * * * *

UNITED STATES PATENT AND TRADEMARK OFFICE
CERTIFICATE OF CORRECTION

PATENT NO.  : 4,906,712
DATED       : MARCH 6, 1990
INVENTOR(S) : DORF ET AL

It is certified that error appears in the above-identified patent and that said Letters Patent is hereby corrected as shown below:

In column 1, line 42, "cl" should read --Cl--.

In column 1, line 45, "heterto" should read --hetero--.

In column 1, end of line 56 after "and", there should be an --R--.

In column 5, end of line 45 after "and", there should be an --R--.

Signed and Sealed this

Thirteenth Day of August, 1991

Attest:

HARRY F. MANBECK, JR.

Attesting Officer   Commissioner of Patents and Trademarks